(12) United States Patent
Adamisin et al.

(10) Patent No.: US 6,276,330 B1
(45) Date of Patent: Aug. 21, 2001

(54) AIR/FUEL INDUCTION SYSTEM FOR DEVELOPING SWIRL MOTION OF AN AIR/FUEL MIXTURE

(75) Inventors: David Wayne Adamisin, Northville; Danrich Henry Demitroff, Okemos; James Roy Bivins, Oak Park; John Clarence Lee, Highland; Michael Bruno Magnan, Dearborn, all of MI (US)

(73) Assignee: Ford Global Technologies, Inc., Dearborn, MI (US)

(*) Notice: Subject to any disclaimer, the term of this patent is extended or adjusted under 35 U.S.C. 154(b) by 0 days.

(21) Appl. No.: 09/511,804

(22) Filed: Feb. 23, 2000

(51) Int. Cl.$^7$ ....................................... F02B 31/08
(52) U.S. Cl. ..................... 123/308; 123/301; 123/302
(58) Field of Search ................... 123/306, 308, 123/432, 301, 302

(56) References Cited

U.S. PATENT DOCUMENTS

| | | |
|---|---|---|
| 4,285,310 | 8/1981 | Takizawa . |
| 4,703,729 | 11/1987 | Sakano et al. . |
| 4,805,569 | 2/1989 | Suzumura et al. . |
| 4,945,867 * | 8/1990 | Tanahashi et al. ................... 123/432 |
| 4,974,566 | 12/1990 | LoRusso et al. . |
| 5,167,211 | 12/1992 | Fukuma et al. . |
| 5,394,845 * | 3/1995 | Noh et al. ............................. 123/308 |
| 5,479,889 | 1/1996 | Sato et al. . |
| 5,558,061 | 9/1996 | Suminski . |
| 5,592,916 | 1/1997 | Stockhausen et al. . |
| 5,797,368 | 8/1998 | Kreuter et al. . |
| 5,950,582 * | 9/1999 | Stein .................................... 123/308 |
| 6,109,234 * | 8/2000 | Vallance et al. ..................... 123/308 |

FOREIGN PATENT DOCUMENTS

| | | | |
|---|---|---|---|
| 1032972 * | 6/1958 | (DE) ..................................... 123/308 |
| 1251998 * | 12/1967 | (DE) ..................................... 123/308 |
| 421116 * | 5/1947 | (IT) ...................................... 123/308 |

* cited by examiner

*Primary Examiner*—Erick Solis
(74) *Attorney, Agent, or Firm*—Jerome R. Drouillard

(57) ABSTRACT

An air/fuel mixture induction system for an internal combustion engine having a pair of intake valves, an intake air/fuel mixture flow passage communicating with each valve, a primary mask surrounding a portion of the perimeter of one of the intake valves, the air/fuel mixture being directed from the intake valve over the remaining peripheral portion thereof, thereby establishing a swirl motion in the combustion chamber, a secondary bridge mask partially surrounding the other of the pair of intake valves, the secondary bridge mask having an air/fuel mixture flow controlling surface that directs the swirl motion of the air/fuel mixture in the direction of the axis of the cylinder whereby swirl motion progresses in the direction of the axis of the cylinder throughout the combustion chamber.

4 Claims, 4 Drawing Sheets

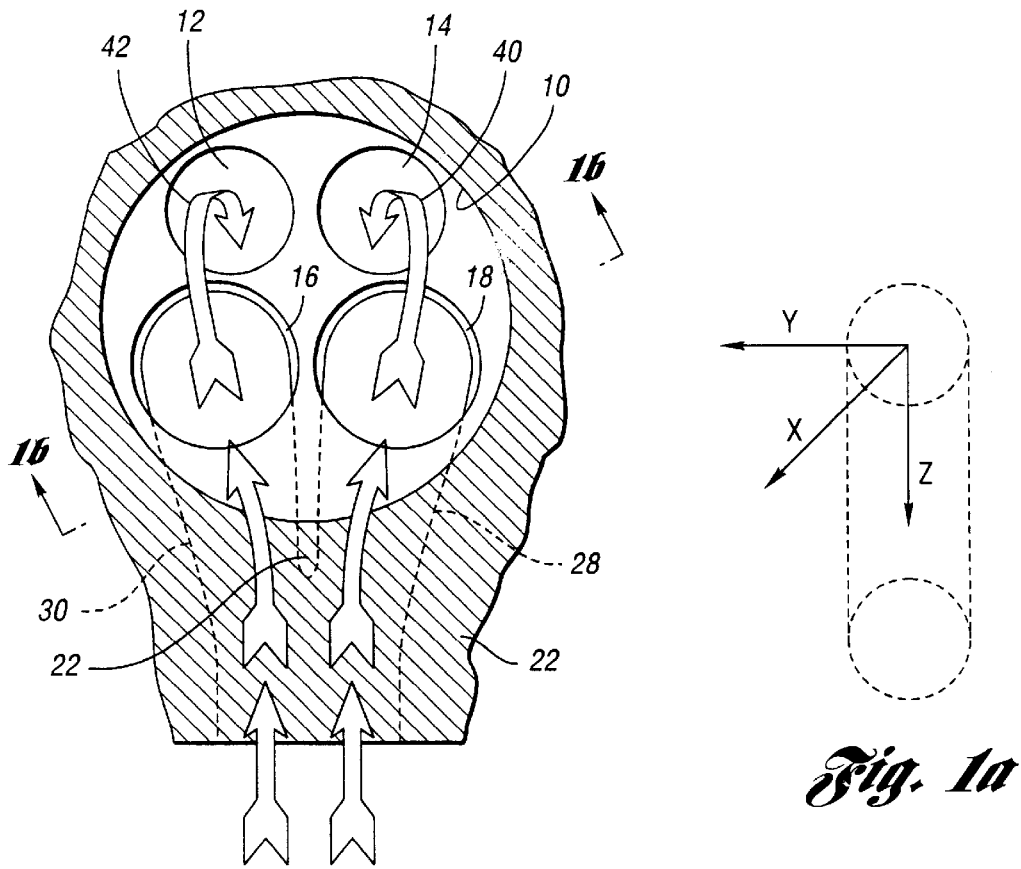
Fig. 1 (PRIOR ART)
Fig. 1a
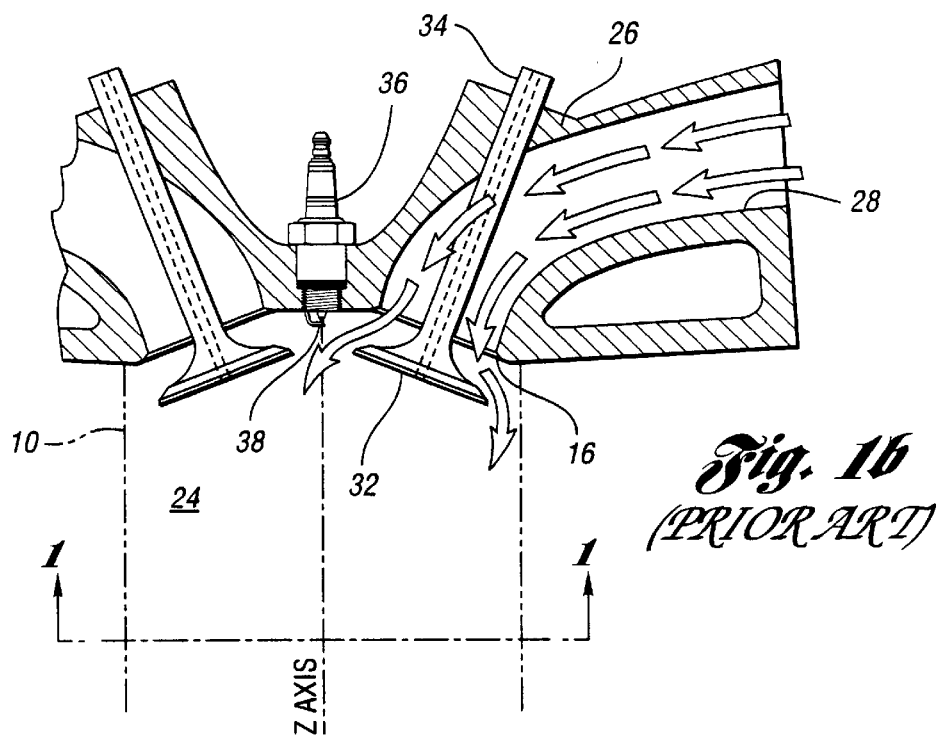
Fig. 1b (PRIOR ART)

AIR/FUEL INDUCTION SYSTEM FOR DEVELOPING SWIRL MOTION OF AN AIR/FUEL MIXTURE

TECHNICAL FIELD

A charge induction system for an internal combustion engine including air/fuel mixture intake ports adapted for developing a swirl motion of an air/fuel mixture.

BACKGROUND ART

Internal combustion engines that use a single intake valve and a single exhaust valve typically are not capable of producing the same intake port area as an internal combustion engine having a pair of intake valves. Thus, intake air/fuel mixture flow for a two-valve engine is less than the corresponding air/fuel mixture flow for a four-valve engine, even in those instances when the two-valve engine valve size has been increased to the maximum practical diameter. Further, the rate of valve opening for a two-valve engine, to achieve a flow comparable to the flow of a four-valve engine of equal displacement, is inherently greater than the rate of valve opening for a four-valve engine. Substantially more valve lift, therefore, is required to achieve the same flow compared to a four-valve engine.

One of the advantages of using a two-valve engine is the inherent ability of a two-valve combustion chamber, with offset intake port locations, to generate an air/fuel mixture swirl motion. This feature contributes to a fast and effective burn at low and moderate engine speeds. Because of this characteristic, better performance at the low speed end of the engine torque output curve can be achieved compared to a four-valve design.

In the case of a four-valve engine, the breathing characteristics at the top power output end of the engine speed curve is superior to the breathing characteristics of a two-valve engine, but low and mid-load range operating characteristics may be less than favorable compared to the corresponding characteristics of a two-valve engine.

One of the characteristics of a four-valve engine that causes inferior performance at the low speed of the engine power range is the difficulty in obtaining an effective swirl motion for the air/fuel mixture to achieve optimum mixing for efficient and rapid combustion. Although a tumble motion of the air/fuel mixture can be achieved in the case of a four-valve design, the effectiveness of the burning of the tumbling air/fuel mixture is less than the comparable effectiveness of a swirl motion of the air/fuel mixture. Even if a swirl motion can be achieved in a four-valve design (e.g., by using an auxiliary charge motion control valve to disable one intake valve port), a central location of the spark plug allows the swirl pattern to encircle the ignition source, which detracts from the effectiveness of the burn notwithstanding the presence of swirl.

DISCLOSURE OF INVENTION

It is an objective of the invention to design a four-valve combustion chamber for an internal combustion engine that is capable of taking advantage of swirl motion of the air/fuel mixture throughout the entire combustion chamber, thereby creating a more efficient charge burn. In this way, the advantages of a two-valve design in the low operating power range of the engine can be matched by a four-valve combustion chamber design without compromising the advantages of the four-valve design during operation of the engine at the high load range.

When the piston compresses the charge in which a swirling motion has been induced using the teachings of the invention, the effect of the swirl motion continues into the later stages of combustion. This is in contrast to an engine with the usual tumbling motion that is characteristic of a four-valve engine where the tumbling air/fuel mass tends to break down during the compression stroke.

By employing the teachings of the present invention, the stability of combustion of the air/fuel mixture is efficient enough to satisfy current cold-start engine emission standards. This is achieved without the necessity for using intake port throttling by a charge motion control valve to enhance the level of the charge motion.

According to a principal feature of the invention, a combustion chamber charge motion is achieved by using valve masks within the combustion chamber itself. A perimeter mask on the primary intake valve and an opposed bridge mask on the secondary valve create a swirl motion that persists throughout the extent of the combustion process, even into the later stages of the compression stroke. The masks direct the air/fuel mixture flow pattern at each of the two intake ports so that they work together to produce a coherent, tangential, spiral-swirl motion.

By using the improved combustion chamber design of the invention, it is possible to achieve a faster motion of the air/fuel mixture by reason of the swirl pattern that is established rather than a typical tumble flow pattern characteristic of a conventional four-valve combustion chamber. This achieves better mixing of the air/fuel mixture for a given time period.

Unlike the tumble flow pattern that is characteristic of a conventional four-valve combustion chamber, the swirl motion established by the design of the present invention makes it possible for the piston to compress the mixture without interrupting the swirl motion. In contrast, the tumble motion that is characteristic of conventional four-valve combustion chambers is interrupted as the piston begins to move upward in its compression stroke.

The improvements of the invention eliminate the so-called dead, isolated zones at the corners of the combustion chamber where the intake and exhaust valves meet the wall of the combustion chamber. The air/fuel mixture flow at those corners is disassociated from the main mixture flow in the combustion chamber when tumble motion characteristic of the conventional combustion chamber takes place. In contrast, the swirl motion that is characteristic of the present invention eliminates the separate air/fuel mixture flow patterns at the isolated zones. The entire combustion chamber is involved in the improved swirl motion, thereby improving mixing of the air and fuel. This results in improved combustion efficiency.

In practicing the present invention, the combustion chamber is provided with primary and secondary air/fuel mixture intake ports and at least one exhaust port. The combustion chamber may have only one exhaust port, as in the case of a three-valve design. An air/fuel intake manifold has intake flow passes communicating with the intake port.

The primary intake valve port is surrounded partly by a primary mask. A secondary mask surrounds a portion of the secondary port. The masks create an air/fuel flow passage through an intake valve opening whereby a charge swirl motion is established as the charge circulates about the axis of the cylinder. The secondary mask creates a charge motion swirl that complements the charge motion swirl created by the primary mask. The secondary mask creates a flow velocity component in the direction of the cylinder axis whereby the entire combustion chamber is filled with a moving air/fuel charge.

BRIEF DESCRIPTION OF DRAWINGS

FIG. 1 is a schematic representation of a conventional four-valve combustion chamber that creates a tumble motion of the air/fuel mixture as the intake valves open;

FIG. 1a is a graphical representation of the principal axes for the combustion chamber illustrated in FIG. 1, the Z-axis corresponding to the geometric central axis of the cylinder;

FIG. 1b is a partial cross-sectional view of one of the intake ports seen in FIG. 1, the plane of FIG. 1b being taken on section line 1b—1b of FIG. 1;

BEST MODE FOR CARRYING OUT THE INVENTION

Figure 2:
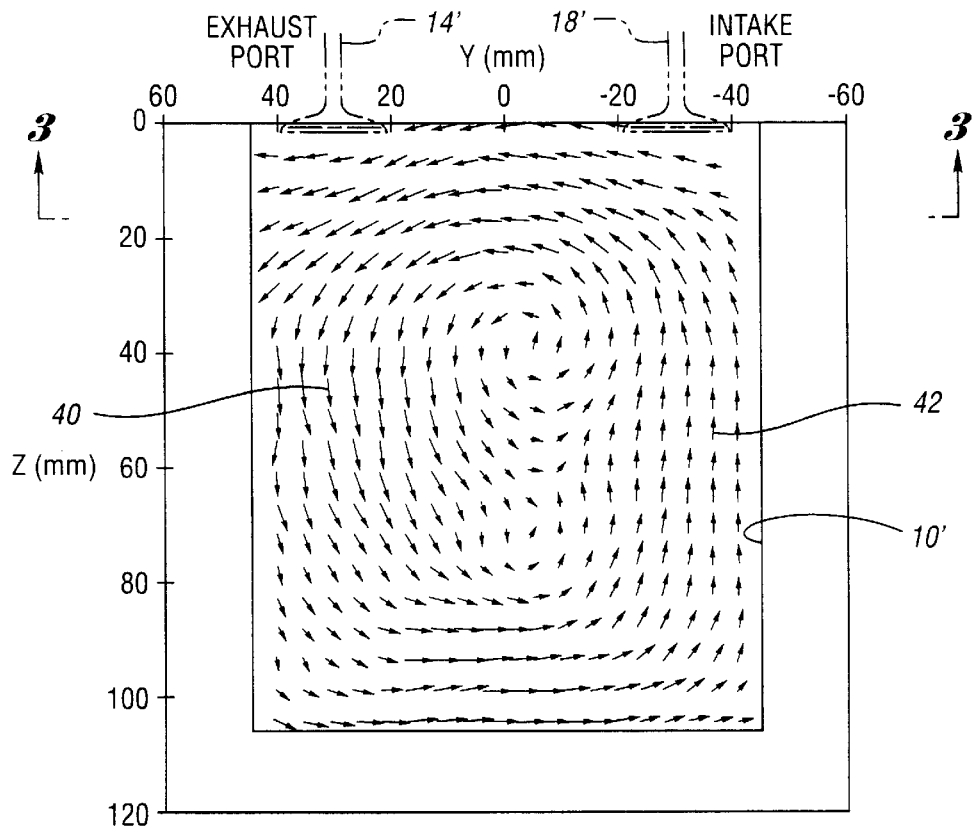
FIG. 2 is a schematic diagram, taken along the plane of section line 2—2 of FIG. 3, showing the tumble flow of the air/fuel mixture in a combustion chamber of the type shown schematically in FIG. 1 wherein the air/fuel mixture establishes a tumble flow pattern.

In FIG. 1, a cylinder is schematically shown at 10, the view of FIG. 1 is a cross-sectional view on a plane perpendicular to the Z-axis shown in FIG. 1a. The Z-axis of FIG. 1a represents the centerline of the cylinder 10.

The perspective of the view of FIG. 1 is on a line of sight from a point on the Z-axis toward the top of the cylinder. A pair of exhaust ports 12 and 14 are located in the combustion chamber at the upper end of the cylinder 10. Likewise, a pair of intake ports 16 and 18 are located in the combustion chamber. The intake ports provide a flow path in a manifold from an air/fuel mixture intake flow passage 20. The manifold has a separator wall 22, which directs the flow of air/fuel mixture to each of the intake ports 16 and 18.

FIG. 1b is a schematic representation of a cross-sectional view of the combustion chamber at the upper end of the cylinder 10. The combustion chamber is designated by reference numeral 24. An air/fuel mixture intake manifold 26 defines the air/fuel mixture intake flow passage 28, which communicates with the intake port 16. A similar air/fuel mixture flow passage in the intake manifold 26 provides flow to the intake port 16. This passage is out of the plane of the sectional view of FIG. 1b, but it is illustrated in the cross-sectional view of FIG. 1 at 30.

An intake valve 32, seen in FIG. 1b, registers with the intake port 16. It is shown in FIG. 1b in the open position. It includes a valve stem 34, which is adjusted in known manner by a valve actuator lever or rocker arm, which can be activated, for example, by a cam and camshaft mechanism in known fashion. The valve 32 is shown in the open position in FIG. 1b. The flow of air/fuel mixture is indicated in FIG. 1b by directional arrows.

Typically, a spark plug 36 is centrally located in the cylinder head with its ignition point 38 in the combustion chamber 24.

The flow directional arrows for the air/fuel mixture are shown also in FIG. 1. When the air/fuel mixture passes through the intake ports 16 and 18, they are directed downward, as indicated by the flow directional arrows at 40 and 42 in FIG. 1.

FIGS. 1 and 1b represent "tumble" flow for the air/fuel mixture in a conventional four-valve engine. When the air/fuel mixture enters the combustion chamber through the intake valves, it is directed downward in the direction of the Z-axis seen in FIG. 1a. The charge motion then returns upwardly toward the top of the cylinder. The tumble motion continues until it is interrupted by the engine piston as the piston advances during the compression stroke toward the top of the cylinder. The disadvantages of the tumble motion are mentioned in the preceding discussion.

FIG. 2 shows a schematic view of the tumble motion created in a conventional four-valve combustion chamber. FIG. 2 is a cross-sectional view taken on a plane parallel to the Z-axis but displaced from the center line of the cylinder in the direction of the X-axis, seen in FIG. 1a. The intake port and the exhaust port, seen in FIG. 2, have been designated by reference characters 18' and 14', respectively. These ports have counterparts in FIG. 1, as shown at 18 and 14. Because of the tumble motion created by the air/fuel charge, the flow velocity vectors 40 seen in FIG. 2 travel downwardly toward the bottom of the cylinder from the combustion chamber. The charge motion circulates across the bottom of the cylinder to the opposite side of the cylinder, as represented by the directional charge flow vectors 42 on the opposite side of the cylinder, which is designated by reference numeral 10' corresponding to cylinder 10 of FIGS. 1a and 1b.

Figure 3:
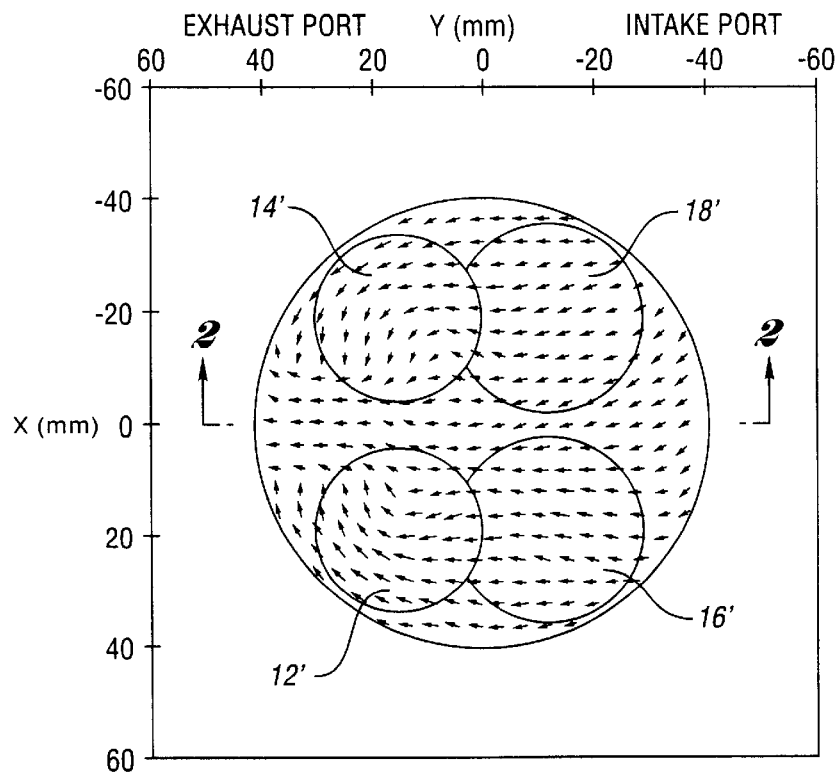
FIG. 3 is a further view of the conventional combustion chamber for a four-valve engine as seen from the plane of section line 3—3 of FIG. 2.

The tumble motion is illustrated further in the cross-sectional view of FIG. 3, which is taken on a plane perpendicular to the Z-axis at a location near the top of the cylinder. The motion pattern for the air/fuel charge is generally from right to left, as seen in the cross-sectional view of FIG. 3, as the charge motion travels from the intake ports 16' and 18' to the exhaust ports 12' and 14'. The length of the arrows, which are motion vectors, is longer near the top of the cylinder where the charge motion is generally transverse relative to the Z-axis. On the other hand, in the regions of the flow seen in FIG. 3, where the charge motion is generally in the direction of the Z-axis, the velocity vectors for the charge motion are shorter.

Figure 4:
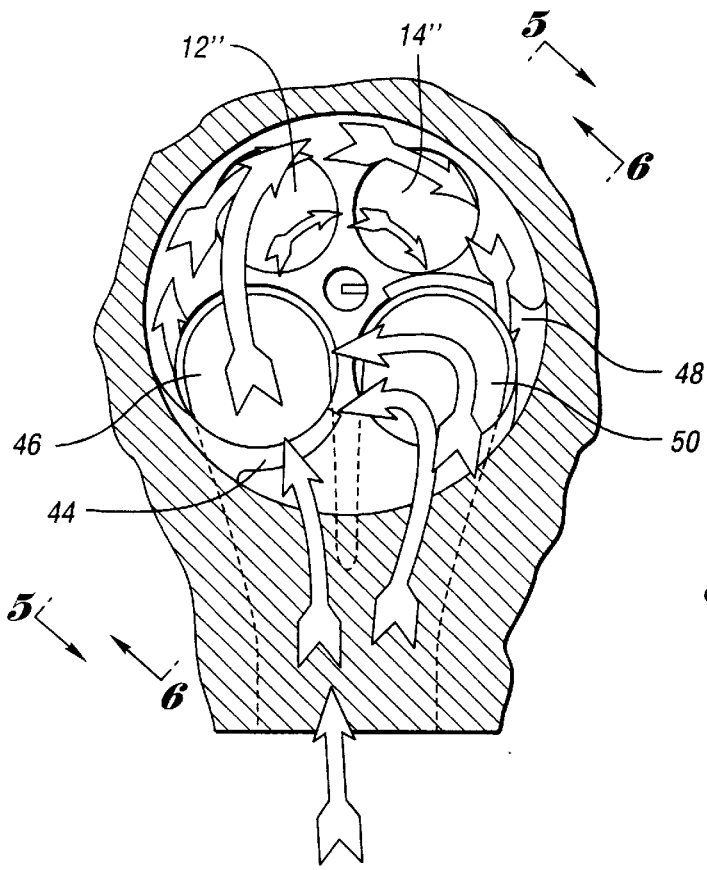
FIG. 4 is a schematic representation of a combustion chamber having four valves and which includes the improvements of the present invention.

In contrast to the four-valve combustion chamber shown in FIGS. 1, 1b, 2 and 3, FIGS. 4–8 show the improved combustion chamber design for effecting improved charge motion. FIG. 4 is a cross-sectional view corresponding to the cross-sectional view of FIG. 1. It differs from the cross-sectional view of FIG. 1, however, because the intake port is provided with a primary mask 44 that surrounds a portion of the intake port 46. Further, secondary bridge mask 48 surrounds a portion of the intake port 50.

Figure 5:
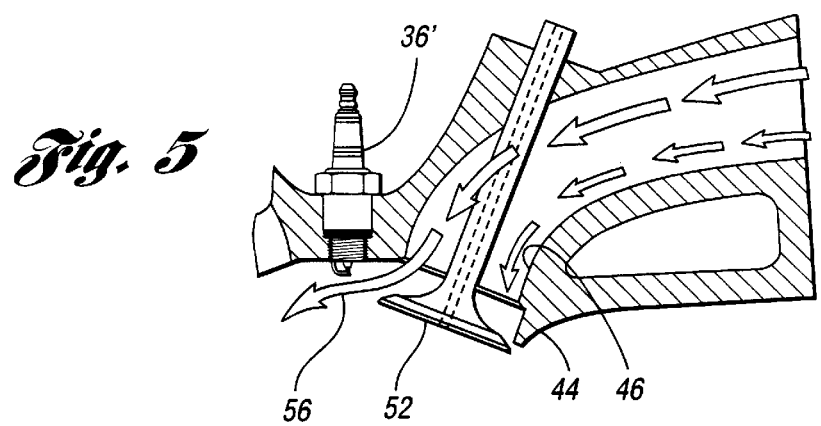
FIG. 5 is a cross-sectional view taken along the plane of section line 5—5 of FIG. 4.
Figure 6:
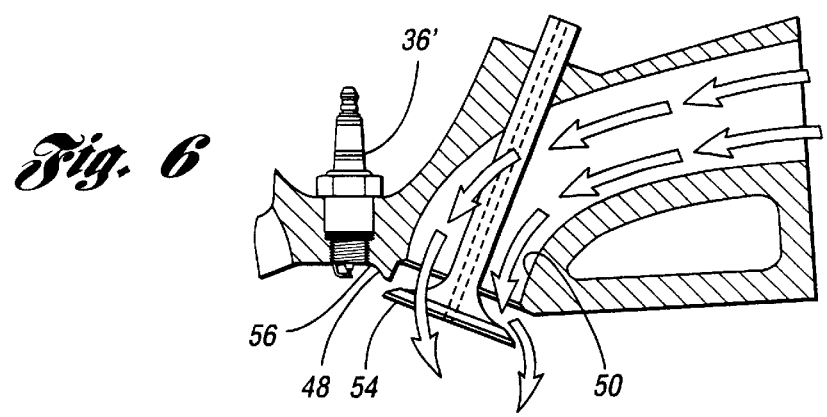
FIG. 6 is a cross-sectional view taken along the plane of section line 6—6 of FIG. 4.

The cross-sectional views of FIGS. 5 and 6, which are taken on a plane parallel to the Z-axis, show the primary intake port 46 and the secondary intake port 50. Each of these ports is controlled by an intake valve as seen at 52 and 54, respectively. The primary mask 44 is located on the periphery of the port 46, as previously mentioned, but it surrounds the port only partially. When the valve 52 is moved to the open position seen in FIG. 5, the mask 44 forces the air charge in a direction perpendicular to the direction of the X-axis, as seen at 56. The mask 44 registers with the margin of the valve 52 so that only the portion of the port that is not affected by the mask 44 will allow the air/fuel charge to pass into the combustion chamber.

Figure 7:
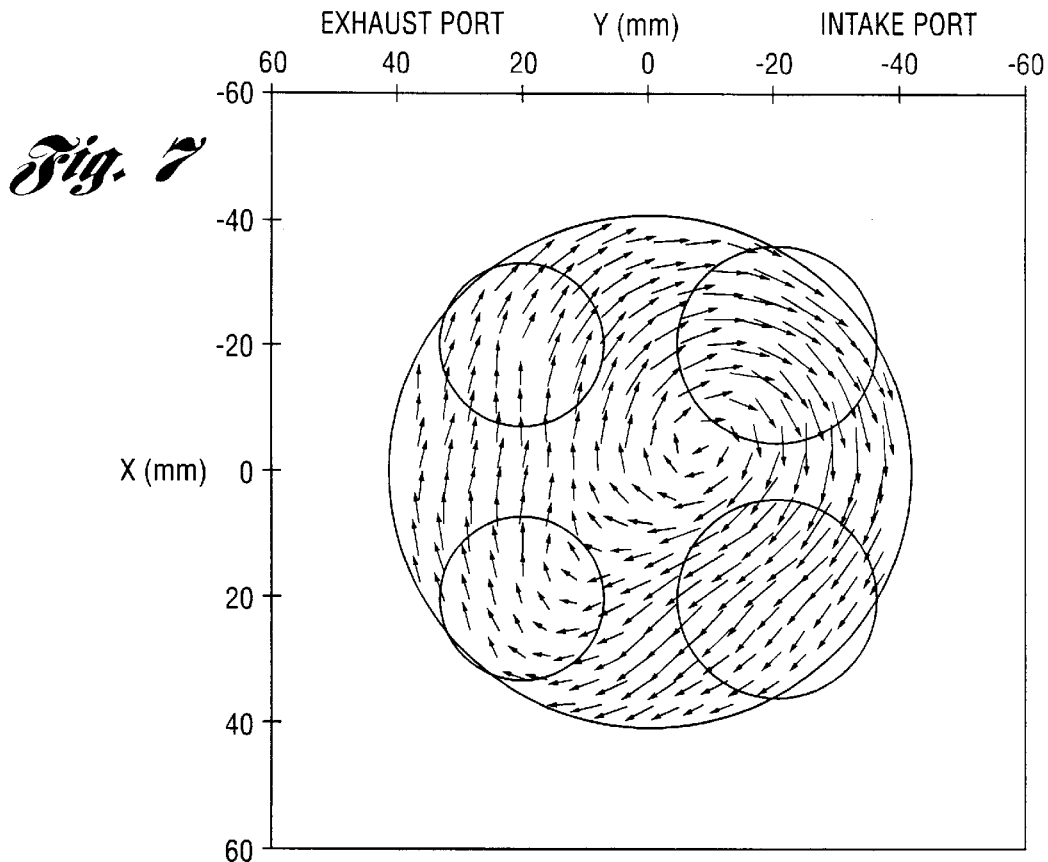
FIG. 7 is a cross-sectional view corresponding to the cross-sectional view of FIG. 3, but which illustrates the combustion chamber swirl pattern that is developed using the teachings of the present invention.
Figure 8:
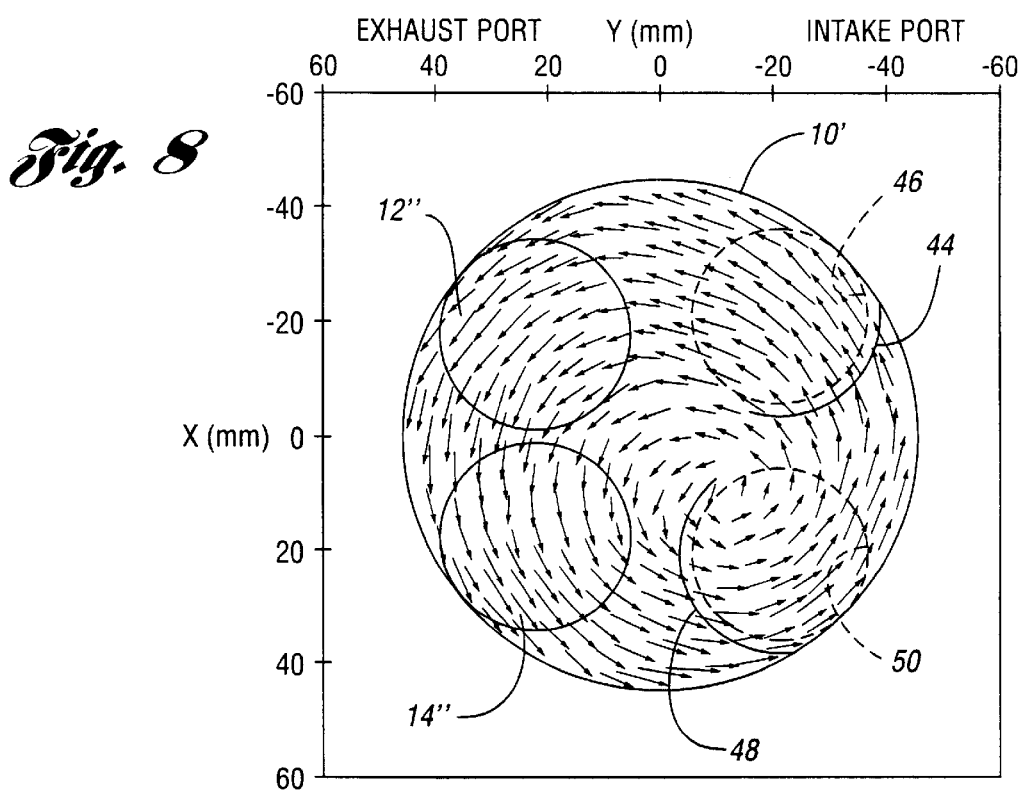
FIG. 8 is a view similar to FIG. 7, but which indicates the location of the primary and the secondary masks which establish a swirl pattern of the air/fuel mixture.

The charge flow vector seen at 55 creates a swirl motion as seen in FIGS. 7 and 8. The swirl motion takes place throughout the entire combustion chamber and circulates generally about the Z-axis. When the swirl pattern reaches the surrounding portion of the secondary intake port 50, it is directed in the Z-axis direction by the secondary mask 48. The secondary mask 48 is provided with a ramp surface, seen in FIG. 6 at 56. The air charge, which is directed in a circular pattern, as seen in FIG. 8, impinges on the ramp surface 56, thereby directing the charge motion downward in the Z-axis direction. The circular motion seen in FIG. 8, therefore, continues its circular motion in a spiral pattern as it progresses downwardly in the cylinder.

FIG. 7 shows the swirl pattern established by the combustion chamber design of the present invention at an upward location near the top of the cylinder. The same swirl pattern progresses downwardly and essentially continues its circular motion about the Z-axis at a location near the bottom of the cylinder. As in the case of the primary mask, the secondary mask registers with the margin of the intake valve 54, thereby directing the air charge flow through the annular opening between the intake port and the opposite edge of the intake valve that does not register with the mask 48. The swirl motion provided by the secondary port enhances the swirl motion established by the primary port, and vice versa.

As the piston moves upwardly in the cylinder during the compression stroke, the swirl motion continues. In contrast to the effect of the piston on the tumble motion of the conventional combustion chamber design, the swirl motion achieved by the combustion chamber design of the present design has a longer duration, thereby providing a more homogeneous air/fuel mixture throughout the entire combustion chamber, which results in improved combustion efficiency.

The exhaust valves in the improved construction chamber of the invention are shown in FIGS. 4, 7 and 8 at 12" and 14", respectively.

Although a preferred embodiment of the invention has been disclosed, it will be apparent to persons skilled in the art that modifications may be made without departing from the scope of the invention. All such modifications and equivalents thereof are covered by the following claims.

What is claimed is:

1. An internal combustion engine comprising a cylinder defining in part a combustion chamber;

said combustion chamber including primary and secondary air/fuel mixture intake ports and at least one exhaust port;

an air/fuel intake manifold having air/fuel intake flow passages communicating with the intake ports;

a primary intake valve registering with the primary intake port and a secondary intake valve registering with the secondary intake port;

a primary mask within the combustion chamber surrounding a portion of the primary intake port;

a secondary mask within the combustion chamber surrounding a portion of the secondary intake port;

the primary mask and the primary intake valve creating an air/fuel flow passage through an intake valve opening defined by the primary intake valve whereby an air/fuel charge motion in a swirl pattern is established as the air/fuel charge circulates about the axis of the cylinder;

the secondary mask and the secondary intake valve creating an air/fuel passage through an intake valve opening defined by the secondary intake valve whereby an air/fuel charge motion in a swirl pattern is established that complements the swirl motion created by the primary mask and the primary intake valve.

2. A combustion chamber for an internal combustion engine having a cylinder defining in part the combustion chamber;

primary and secondary intake ports and at least one exhaust port in the combustion chamber;

a primary mask within the combustion chamber surrounding a portion of the primary intake port;

a secondary mask within the combustion chamber surrounding a portion of the secondary port;

a primary intake valve controlling the opening of the primary intake port and a secondary intake valve controlling the opening of the secondary intake port;

the primary mask and the primary intake valve directing an air/fuel charge in a generally circular swirl pattern throughout the combustion chamber;

the secondary mask and the secondary intake valve directing an air/fuel charge in a generally circular swirl pattern that complements the circular swirl pattern created by the primary valve and the primary intake port;

the air/fuel charge, as it moves in a swirl pattern, being directed by the secondary mask to effect a flow velocity component in the direction of the axis of the cylinder whereby the entire combustion chamber is filled with a moving air/fuel charge.

3. The internal combustion engine set forth in claim 1 wherein the secondary mask is provided with a ramp surface that is impinged by the air/fuel charge as it moves in a swirl pattern, the ramp surface being located at the margin of the secondary intake port angularly displaced from the intake valve opening defined by the secondary intake valve;

one side of the secondary mask having a ramp surface whereby the air/fuel charge has a generally spiral motion throughout the combustion chamber.

4. The combustion chamber as set forth in claim 2 wherein the secondary mask is provided with a ramp surface that is impinged by the air/fuel charge as it moves in a swirl pattern, the ramp surface being located at the margin of the secondary intake port angularly displaced from the intake valve opening defined by the secondary valve;

one side of the secondary mask having a ramp surface whereby the air/fuel charge has a generally spiral motion throughout the combustion chamber.

* * * * *